March 7, 1961  G. E. PLATZER, JR., ET AL  2,974,255
ELECTRONIC CONTROL DEVICE
Filed June 5, 1953
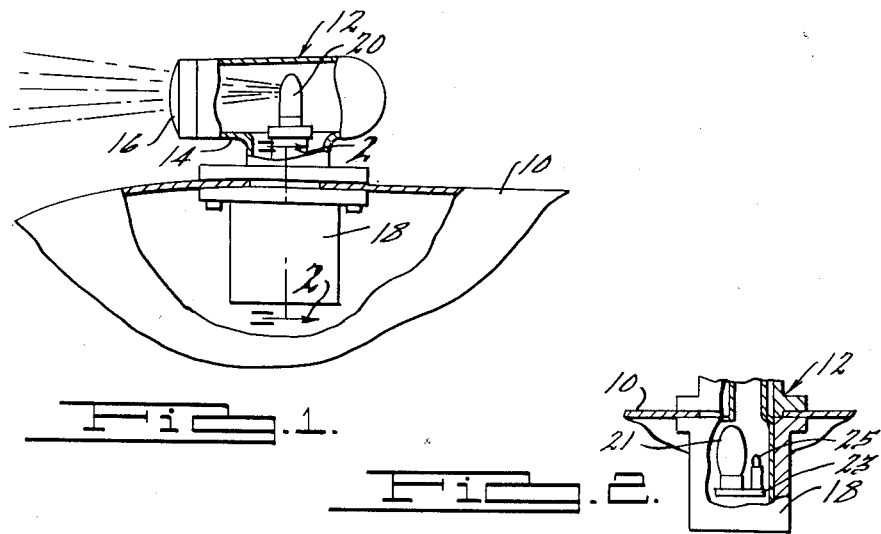
Fig. 1.
Fig. 2.
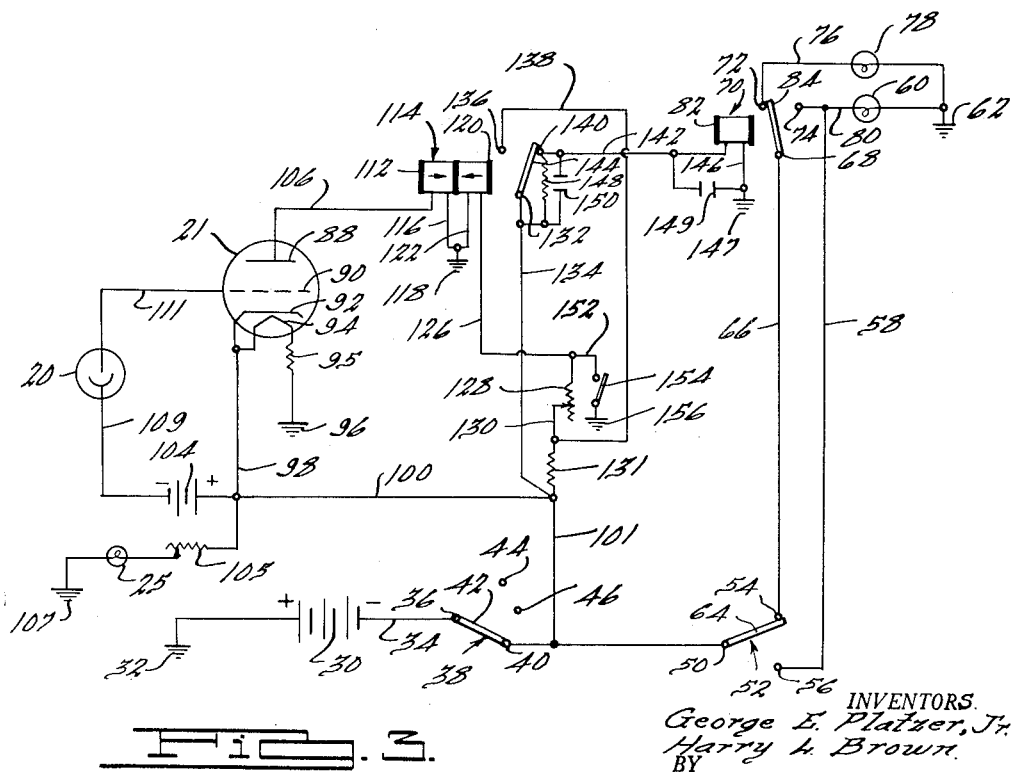
Fig. 3.
INVENTORS.
George E. Platzer, Jr.
Harry L. Brown
BY
Harness and Harris
ATTORNEYS

United States Patent Office 2,974,255
Patented Mar. 7, 1961

2,974,255
ELECTRONIC CONTROL DEVICE

George E. Platzer, Jr., Detroit, and Harry L. Brown, Inkster, Mich., assignors to Chrysler Corporation, Highland Park, Mich., a corporation of Delaware Filed June 5, 1953, Ser. No. 359,941

12 Claims. (Cl. 315—83)

Our invention relates to electronic control systems and has particular reference to improved light sensitive systems especially adapted for use with motor vehicles.

In the past, motor vehicle headlights have been switched from a low to a high beam and vice versa by a manually operated foot switch. This method of operation is very tiresome and annoying especially where a considerable amount of night driving is done by the vehicle operator. It has been found to be very advantageous to employ a device to automatically dim the vehicle headlights in response to the light intensity of an oncoming vehicle. It has been found to be advantageous to operate an automatic system of the aforementioned by using the automobile battery or generator system of, for example, 6 to 12 volts. It has also been found to be advantageous to employ an automatic system wherein the aforementioned battery or generator voltage is in no way boosted within the system. No circuit component will have an operating voltage higher than the vehicle battery or generator voltage.

A principal object of our invention is to provide an improved system for effecting automatic control of vehicle headlights and the like.

Another object of our invention is to provide an improved system of the aforementioned type which is easily as well as economically manufactured.

Still a further object of our invention is to provide an improved electronic device which has primary components that may be effectively operated by the generator or battery voltage of the vehicle.

More specifically, our invention relates to an improved electronic circuit for providing automatic control of vehicle headlights wherein a vacuum tube is utilized which will provide sufficient plate current to operate a relay while operating with a plate voltage of approximately 6–12 volts. This voltage is obtained from the vehicle generator or battery.

Other objects and advantages of our invention will become more apparent from the following description of our invention, reference being had to the accompanying drawings in which:

Fig. 1 is a fragmentary view of a vehicle fender illustrating, mechanically, the adaptation of our improved headlight control device to a motor vehicle.

Fig. 2 is a fragmentary sectional view taken on line 2—2 of Fig. 1 and illustrating the vacuum tube utilized in our invention and its relationship to a small grid light.

Fig. 3 is a schematic diagram illustrating, electronically, our improved control system.

Referring now to Fig. 1, we have shown a portion of a vehicle fender 10 which has our improved device, generally indicated by the numeral 12, mounted thereon. Our device includes a casing 14 having a lens 16 at the front end thereof. A box-like member 18 depends from the casing 14 below the fender 10 and contains the electrical components of our improved headlight control device. A photoelectric tube 20, which is one of the electrical components, extends upwardly from the box 18 and into the casing 14. By this construction, light that passes through the lens 16 is focused on the tube 20 and thereby energizes it.

In Fig. 2 we have shown the box 18 which houses a vacuum tube 21 mounted on a bracket 23. Also mounted on the bracket 23 is a small grid light 25 which is disposed adjacent the glass portion of the tube 21. The functions of the tube 21 and light 25 and the reason for their close proximity will be hereinafter set forth. The other portions of the electrical circuit are not shown in Fig. 2 for the purpose of simplicity.

Referring now to Fig. 3, it will be understood that all of the ground connections shown in this figure are common connections so that electrically they are connected together. A source of electrical energy 30 which may be the vehicle battery or generator or both has its positive terminal grounded at 32 while its negative terminal is connected by wire 34 to common contact 36 of a headlamp switch generally indicated by the numeral 38. Contact 36 is connected to contact 40 by the movable switch element 42, the contact 40 being the headlamp contact of the switch. The switch 38 is also provided with contacts 44 and 46 which are the "Off" and "Park" positions of the headlight switch. The contact 40 of the switch 38 is connected by wire 48 to common contact 50 of a conventional type foot dimmer switch generally indicated by the numeral 52. The switch 52 is provided with high beam contact 54 and low beam contact 56, the latter being connected through wire 58 to one side of the low beam lights indicated at 60 while the other side of the lights 60 is grounded at 62.

As shown in Fig. 3, the switch 52 is provided with a movable element 64, shown in the high beam position connecting the contacts 50 and 54. The contact 54 is connected by wire 66 to common contact 68 of a relay generally indicated by the numeral 70. The relay is also provided with high beam contact 72 and low beam contact 74, the former being connected through wire 76 to one side of the high beam lights indicated at 78. The other side of the high beam lights 78 are also grounded at 62. The low beam contact 74 is connected by wire 80 to the same side of the low beam lights 60 as the wire 58 is connected. During normal operation of the vehicle headlights, when the foot dimmer switch 52 is in the position shown in the drawings to energize the high beam lights, the coil 82 of the relay 70 is energized pulling the movable switch element 84 of the relay into the position shown in the drawings so that the high beam lights 78 are energized. The reason why the coil 82 of the relay is energized at this time and how it is energized will be hereinafter set forth.

Our improved device includes a vacuum tube 21 which is provided with a plate 88, a control grid 90, a cathode 92 and a heater 94. One side of the heater 94 is grounded at 96 through a resistor 95 while the other side of the heater is externally connected to the cathode 92 and both this side of the heater and the cathode are connected through wires 98 and 100 and 101 to the high beam contact 40 of the switch 38. This connection in effect supplies a negative voltage from the source 30 to the cathode and heater.

A bias cell 104 has its positive side connected to the cathode 92 through wire 98 while its negative side is connected through wire 109 to one side of the photo tube 20. The other side of the tube 20 is connected by wire 111 to the grid 90 of the vacuum tube 21. A sensitivity potentiometer 105 has one side connected through wire 100 and the switch 38 to the source 30. The other side of the potentiometer 105 is grounded at 107 through grid light 25. The function of these parts will be hereinafter set forth.

The plate 88 of the tube 21 is connected by wire 106 to one lead of coil 112 of a differential relay generally indicated by the numeral 114. The other lead of the coil 112 of the differential relay 114 is connected through wire 116 to the ground 118. The other coil 120 of the differential relay 114 has one side connected by wire 112 to the ground 118. The other side of the coil 120 is connected through wire 126 to one side of potentiometer 128 while the other side is connected through wire 130 and resistor 131 to wire 101 and hence to the negative side of the source 30 through the switch 38.

The differential relay 114 is provided with a common contact 132 which is connected through wire 134 to wire 101 and hence to the source 30 through switch 38. The relay 114 is also provided with a contact 136 which is connected through wire 138 to wire 130 and with a contact 140 which is connected through wire 142 to one side of the relay coil 82 of the relay 70. The differential relay 114 is also provided with a movable contact element 144 which, as shown in the drawings, is in the position to connect the contacts 132 and 140. The other side of the relay coil 82 is connected by wire 146 to ground 147. The coil 82 is shunted by condenser 149 and the contacts 132 and 140 of the differential relay 114 are shunted by a resistor 148 and a condenser 150 for reasons hereinafter set forth. As shown in the drawings, the side of the potentiometer 128 which is connected to wire 126 from the relay coil 120 is also connected through wire 152 to one side of a spring pressed switch 154. The other side of the switch 154 is grounded at 156. The purpose of the switch also will be hereinafter set forth.

We will first consider the operation of our improved device when the photo tube 20 is not energized, that is to say, when there is no light of any appreciable amount being projected from the front of an opposing vehicle. When the photo tube 20 is not energized, there is no current flowing through the photo tube 20, and the bias cell 104. Under these conditions, the grid 90 has no appreciable effect on the operation of the vacuum tube 21 and plate current flows through the vacuum tube substantially uninterrupted. In view of the fact that the coil 112 of the differential relay 114 is connected in series with the vacuum tube, and the source, the plate current of the vacuum tube also flows through this coil and energizes it. It will also be seen that the coil 120 of the differential relay is connected in series with the source through the resistor 131 and the potentiometer 128 so that this coil is also energized. The differential relay 114 is conventional in that the coils 112 and 120 are wound in opposite directions so that when both are energized, their magnetic fields tend to cancel each other.. Under the conditions heretofore described, therefore, the magnetic fields of the coils 112 and 120 nullify each other to the extent that the movable element 144 of the relay remains in the position shown in the drawings. In this position, the coil 82 of the relay 70 is energized since one side is connected through wire 146 to ground while the other side is connected through wire 142, the movable element 144 and wire 134 to the source through the switch 38. Since the relay 70 is energized, the movable element 84 of the relay is held in position to connect the contact 68 and 72 to thereby energize the high beam lights 78.

When, however, light is applied to the photo tube 20, electrons are emitted and deposited on the grid 90 of the vacuum tube 21. To control this deposit of electrons, we have provided a very novel feature of our invention. As shown in Fig. 2, a grid light 25 is deposed adjacent the side of the glass vacuum tube 21. We have chosen the type of vacuum tube wherein a portion of the grid is exposed to light. That is, this portion of the grid is not surrounded by the plate of the tube. It has been found that the grids of many tubes, including the ones used in testing our invention, are light sensitive. That is to say, light causes electrons to be emitted from the grid. The amount of electrons emitted is proportional to the intensity of the light applied. The sensitivity potentiometer 105 controls the light intensity of the grid light 25 and therefore the plate current of the vacuum tube 21. The grid light 25 has the same effect on the grid circuit of the vacuum tube as would a grid leak resistor connected between the grid and cathode of the vacuum tube. Adjustment of the sensitivity potentiometer 105 can regulate the amount of plate current reduction relative to the amount of light applied to the photo tube 20. As a result, when a predetermined amount of light is applied to the photo tube 20, the current going through the coil 112 of the differential relay is materially reduced thereby reducing the intensity of its magnetic field. When this happens, there is no longer enough magnetic field to cancel the magnetic field of the coil 120 and the resultant magnetic field causes the movable element 144 to swing to thereby connect the contact 136 with the contact 132 and disconnect the contact 140 from the contact 132. This last mentioned disconnection breaks the circuit which energizes the coil 82 of the relay 70 thereby deenergizing this relay and causing the movable element 84 to swing over and bridge the contacts 74 and 68 thereby disconnecting the high beam lights and connecting the low beam lights. It will be seen, therefore, that light applied to the photo cell 20 through the various electrical components causes the energization and the deenergization of the relay 70 to thereby effect a switching from high beam lights to low beam lights. Similarly, when the photo cell is once again deenergized, current again flows through the vacuum tube 21 in a sufficient amount to again cause the coil 112 to build up a magnetic field sufficient to substantially nullify the magnetic field created in the coil 120 and the coil 82 of the relay 70 is once again energized so that the high beam lights are again switched on.

Another special feature of our invention is the use of the contact 136 of the differential relay when the device is in its automatic low beam light position as, for example, when the movable element 144 bridges the contacts 132 and 136. When this happens, the resistor 124 which is in one leg of the coil 120 is shorted out by wire 138 to thereby increase the current passing though the coil 120 which thereby increases the magnetic field of the coil 120 to hold the movable element 144 more securely against the contact 136 and substantially eliminate the possibility of any relay chatter.

It has also been found that during operation of our improved device that the magnetic field which is built up by the relay coil 82 causes an inductive kickback through the circuit when this coil is energized and deenergized. This inductive kickback has been materially reduced by bridging the coil 82 with the condenser 149. Arcing between the movable contact 144 and the contact 140 has been materially reduced by bridging these contacts with resistor 148 and condenser 150.

It should also be pointed out at this time that the sensitivity potentiometer 128 which is in the circuit with the coil 120 acts to regulate the operating point of the differential relay 114. For example, the potentiometer 128 may be regulated to set the current of the relay coil 120. By so adjusting the potentiometer, the operating point of the relay 114 may be predetermined.

The switch 154 is also a special feature of our invention and is very convenient when using our improved device. For example, when a driver is operating his vehicle at night and the lights from an oncoming vehicle have energized his automatic system to change his headlights from high beam to low beam, it has been found expedient to again change his lights to high beam as a signal to the oncoming vehicle to reduce the brilliance of these approaching lights. The switch 154 accomplishes this purpose. Under these aforementioned conditions, the relay coil 112 of the differential relay 114 is substantially deenergized while the relay coil 120 is energized causing the movable element 144 to break the circuit of the relay coil 82. However, when the switch 154 is compressed, the relay coil 120 is shorted to ground and deenergized causing the movable element 144 to again bridge the contacts 132 and 140 to again energize the coil 82 which moves the movable element 84 to again energize the high beam lights 78. The switch 154 is preferably an auxiliary switch which is spring pressed so that all the driver need do is tap his foot on it a few times to go from low beams to high beams and back to low beams.

It should be further pointed out that the use of the differential relay is conducive to voltage stabilization. It will be seen that a variance in the battery or generator voltage will affect both coils of the differential relay thereby causing no change.

Under actual operating conditions, a conventional photoelectric tube 20 was used in conjunction with a four one and one half volt bias cell. Under these conditions, a minute amount of current was used in the bias cell circuit so that it could be safely said that the bias cell will last as long as the ordinary shelf life of a battery. Similarly, a 6–8 volt pilot light was used as the grid light 25 and was operated at a voltage below six volts due to the voltage drop in the potentiometer 105, thereby insuring a long life. Under actual test, a Radio Manufacturers Association type 6AS7 tube was used and it was found that this tube operated very well with the battery or generator voltage of the vehicle as its plate voltage. It has been found, however, that a Radio Manufacturers Association type 6080 will also operate satisfactorily. It will be noted at this point that tube 6AS7 is a dual triode tube but that during the test, the identical elements of the tube were connected in parallel and that a single triode tube was shown in the drawings for the purpose of simplicity. It was found under test that our improved control mechanism drew approximately two and one-half amperes as compared to twenty-five amperes drawn by the headlights.

By utilizing our improved headlight control system, maximum performance is obtained by the use of a relatively few number of parts. It should also be noted that the voltage of our improved system does not require a higher voltage than that delivered by the vehicle battery or generator.

While we have illustrated and described but one embodiment of our invention, it is to be understood that such is for the purpose of illustration only, and it is contemplated that those skilled in the art may modify certain details without departing from the spirit or scope of the invention as defined in the claims appended hereto.

We claim:

1. An improved electronic system for effecting automatic control of high and low beam headlights of a vehicle comprising a battery; a vacuum tube; including a cathode, a control grid and a plate; first circuit means including a light responsive element connected between the cathode and control grid of said tube for effecting control of current passing between the cathode and plate of said tube; a relay including coil means and switch means; second circuit means connecting said relay coil means directly in series with said battery, the plate and cathode of said tube; and third circuit means connecting said electric circuit with said switch means.

2. An improved electronic system for effecting automatic control of high and low beam headlights of a vehicle having a source of electrical energy including a battery comprising a vacuum tube having a plate member; a grid member and an electron emitting member, a light sensitive electron emitting device, a bias cell, circuit means connecting said light sensitive device in series with said bias cell and between said emitting member of said tube and said grid member so that electrons emitted from said device in response to light applied thereto will be disposed on said grid member, means operably associated with said grid member for biasing the same relative to said electron emitting member when said device is energized, relay means including circuit means connecting said relay means with said plate member of said tube and connecting said electron emitting member of said tube and said relay means directly with said battery so that electrons will flow from said battery through said tube and said relay means and back to said battery, the electron flow through said tube and relay means being substantially unimpaired when said light sensitive device is unenergized but being substantially reduced in response to the flow of electrons from said device to said grid element, and circuit means connected to said relay means and connected to said battery and said high and low beam headlights to effect selective energization of said headlights in response to operation of said relay means.

3. An improved electronic system for effecting automatic control of high and low beam headlights of a vehicle having a source of electrical energy comprising a vacuum tube having a plate member; a grid member and an electron emitting member, a light sensitive electron emitting device, a bias cell, circuit means connecting said light sensitive device in series with said bias cell and between said emitting member of said tube and said grid member so that electrons emitted from said device in response to light applied thereto will be disposed on said grid member, means operably associated with said grid member for biasing the same relative to said electron emitting member when said device is energized, a differential relay including first and second coils having opposed magnetic fields and a single pole double throw switch, circuit means connecting said first coil of said relay with said plate element of said tube and adapted to connect said electron emitting member of said tube and said first coil with said source so that electrons will flow from said source through said tube and said first coil and back to said source, the electron flow through said tube and first coil being substantially unimpaired when said light sensitive device is unenergized but being substantially reduced in response to the flow of electrons from said device to said grid element, a fixed resistor, circuit means connecting said fixed resistor in series with the second coil of said differential relay and adapted to connect said last mentioned circuit components with said source so that said second coil will remain energized, circuit means adapted to connect the movable contact of said single pole double throw switch to said source, a power relay including a coil and a single pole double throw switch, circuit means connecting the coil of said power relay with the switch of said differential relay and adapted to connect said last mentioned components with said source so that said power relay is energized when the switch of said differential switch is in its de-energized position, circuit means connecting said differential relay switch with said fixed resistor so that said fixed resistor is shorted out to thereby increase current flow through said second coil in response to energization of said differential relay switch, and circuit means adapted to connect the movable contact of said power relay switch with said source and the remaining contacts with said high and low beam headlights so that either said high beam headlights or low beam headlights will be energized in response to energization or de-energization of said power relay, respectively.

4. An improved electronic system for effecting automatic control of high and low beam headlights of a vehicle having a source of electrical energy comprising a vacuum tube having a plate member; a grid member and an electron emitting member, a light sensitive electron emitting device, a bias cell, circuit means connecting said light sensitive device in series with said bias cell and between said emitting member of said tube and said grid member so that electrons emitted from said device in response to light applied thereto will be disposed on said grid member, means operably associated with said grid member for biasing the same relative to said electron emitting member when said device is energized, a differential relay including first and second coils having opposed magnetic fields and a single pole double throw switch, circuit means connecting said first coil of said relay with said plate element of said tube and adapted to connect said electron emitting member of said tube and said first coil with said source so that electrons will flow from said source through said tube and said first coil and back to said source, the electron flow through said tube and first coil being substantially unimpaired when said light sensitive device is unenergized but being substantially reduced in response to the flow of electrons from said device to said grid element, a second variable resistor, a fixed resistor, circuit means connecting said second variable resistor and said fixed resistor in series with the second coil of said differential relay and adapted to connect said last mentioned circuit components with said source so that said second coil will remain energized, said second variable resistor being operable to regulate the intensity of the magnetic field of said second coil, circuit means adapted to connect the movable contact of said single pole double throw switch to said source, a power relay including a coil and a single pole double throw switch, circuit means connecting the coil of said power relay with the switch of said differential relay and adapted to connect said last mentioned components with said source so that said power relay is energized when the switch of said differential switch is in its de-energized position, circuit means connecting said differential relay switch with said fixed resistor so that said fixed resistor is shorted out to thereby increase current flow through said second coil in response to energization of said differential relay switch, and circuit means adapted to connect the movable contact of said power relay switch with said source and the remaining contacts with said high and low beam headlights so that either said high beam headlights or low beam headlights will be energized in response to energization or de-energization of said power relay, respectively.

5. An improved electronic system for effecting automatic control of high and low beam headlights of a vehicle having a source of electrical energy comprising a vacuum tube having a plate member; a grid member and an electron emitting member, a light sensitive electron emitting device, a bias cell, circuit means connecting said light sensitive device in series with said bias cell and between said emitting member of said tube and said grid member so that electrons emitted from said device in response to light applied thereto will be disposed on said grid member, means operably associated with said grid member for biasing the same relative to said electron emitting member when said device is energized, a differential relay including first and second coils having opposed magnetic fields and a single pole double throw switch, circuit means connecting said first coil of said relay with said plate element of said tube and adapted to connect said electron emitting member of said tube and said first coil with said source so that electrons will flow from said source through said tube and said first coil and back to said source, the electron flow through said tube and first coil being substantially unimpaired when said light sensitive device is unenergized but being substantially reduced in response to the flow of electrons from said device to said grid element, a second variable resistor, circuit means connecting said second variable resistor in series with the second coil of said differential relay and adapted to connect said last mentioned circuit components with said source so that said second coil will remain energized, said second variable resistor being operable to regulate the intensity of the magnetic field of said second coil, circuit means adapted to connect the movable contact of said single pole double throw switch to said source, a power relay including a coil and a single pole double throw switch, circuit means connecting the coil of said power relay with the switch of said differential relay and adapted to connect said last mentioned components with said source so that said power relay is energized when the switch of said differential switch is in its de-energized position, and circuit means adapted to connect the movable contact of said power relay switch with said source and the remaining contacts with said high and low beam headlights so that either said high beam headlights or low beam headlights will be energized in response to energization or de-energization of said power relay, respectively.

6. An improved electronic system for effecting automatic control of high and low beam headlights of a vehicle having a source of electrical energy comprising a vacuum tube having a plate member; a grid member and an electron emitting member, said vacuum tube having a translucent envelope and being so constructed that the grid member is directly exposed to light passing through said envelope, a light sensitive electron emitting device, a bias cell, circuit means connecting said light sensitive device in series with said bias cell and between said emitting member of said tube and said grid member so that electrons emitted from said device in response to light applied thereto will be disposed on said grid member, a grid light, a variable resistor, circuit means connecting said resistor in series with said grid light and adapted to connect same with said source so that the intensity of emitted light from said grid light will vary in response to change in value of said resistor, said grid light being disposed adjacent the envelope of said vacuum so that light emitted therefrom will strike said grid element to thereby cause electron emission from said grid element and bias said grid member relative to said electron emitting member of said tube, relay means, circuit means connecting said relay means with said plate element of said tube and adapted to connect said electron emitting member of said tube and said relay means with said source so that electrons will flow from said source through said tube and said relay means and back to said source, the electron flow through said tube and relay means being substantially unimpaired when said light sensitive device is unenergized but being substantially reduced in response to the flow of electrons from said device to said grid element, and circuit means connected to said relay means and adapted to be connected to said source and said high and low beam headlights to effect selective energization of said headlights in response to operation of said relay means.

7. An improved electronic system for effecting automatic control of high and low beam headlights of a vehicle having a source of electrical energy comprising a vacuum tube having a plate member; a grid member and an electron emitting member, said vacuum tube having a translucent envelope and being so constructed that the grid member is directly exposed to light passing through said envelope, a light sensitive electron emitting device, a bias cell, circuit means connecting said light sensitive device in series with said bias cell and between said emitting member of said tube and said grid member so that electrons emitted from said device in response to light applied thereto will be disposed on said grid member, a grid light, a variable resistor, circuit means connecting said resistor in series with said grid light and adapted to connect same with said source so that the intensity of emitted light from said grid light will vary in response to change in value of said resistor, said grid light being disposed adjacent the envelope of said vacuum so that light emitted therefrom will strike said grid element to thereby cause electron emission from said grid element and bias said grid member relative to said electron emitting member of said tube, a differential relay including first and second coils having opposed magnetic fields and a single pole double throw switch, circuit means connecting said first coil of said relay with said plate element of said tube and adapted to connect said electron emitting member of said tube and said first coil with said source so that electrons will flow from said source through said tube and said first coil and back to said source, the electron flow through said tube and first coil being substantially unimpaired when said light sensitive device is unenergized but being substantially reduced in response to the flow of electrons from said device to said grid element, circuit means connected to the second coil of said differential relay and adapted to connect said last mentioned coil with said source so that said second coil will remain energized, circuit means adapted to connect the movable contact of said single pole double throw switch to said source, a power relay including a coil and a single pole double throw switch, circuit means connecting the coil of said power relay with the switch of said differential relay and adapted to connect said last mentioned components with said source so that said power relay is energized when the switch of said differential switch is in its de-energized position, and circuit means adapted to connect the movable contact of said power relay switch with said source and the remaining contacts with said high and low beam headlights so that either said high beam headlights or low beam headlights will be energized in response to energization or de-energization of said power relay, respectively.

8. An improved electronic system for effecting automatic control of high and low beam headlights of a vehicle having a source of electrical energy comprising a vacuum tube having a plate member; a grid member and an electron emitting member, said vacuum tube having a translucent envelope and being so constructed that the grid member is directly exposed to light passing through said envelope, a light sensitive electron emitting device, a bias cell, circuit means connecting said light sensitive device in series with said bias cell and between said emitting member of said tube and said grid member so that electrons emitted from said device in response to light applied thereto will be disposed on said grid member, a grid light, a first variable resistor, circuit means connecting said resistor in series with said grid light and adapted to connect same with said source so that the intensity of emitted light from said grid light will vary in response to change in value of said resistor, said grid light being disposed adjacent the envelope of said vacuum so that light emitted therefrom will strike said grid element to thereby cause electron emission from said grid element and bias said grid member relative to said electron emitting member of said tube, a differential relay including first and second coils having opposed magnetic fields and a single pole double throw switch, circuit means connecting said first coil of said relay with said plate element of said tube and adapted to connect said electron emitting member of said tube and said first coil with said source so that electrons will flow from said source through said tube and said first coil and back to said source, the electron flow through said tube and first coil being substantially unimpaired when said light sensitive device is unenergized but being substantially reduced in response to the flow of electrons from said device to said grid element, a second variable resistor, circuit means connecting said second variable resistor in series with the second coil of said differential relay and adapted to connect said last mentioned circuit components with said source so that said second coil will remain energized, said second variable resistor being operable to regulate the intensity of the magnetic field of said second coil, circuit means adapted to connect the movable contact of said single pole double throw switch to said source, a power relay including a coil and a single pole double throw switch, circuit means connecting the coil of said power relay with the switch of said differential relay and adapted to connect said last mentioned components with said source so that said power relay is energized when the switch of said differential switch is in its de-energized position, and circuit means adapted to connect the movable contact of said power relay switch with said source and the remaining contacts with said high and low beam headlights so that either said high beam headlights or low beam headlights will be energized in response to energization or de-energization of said power relay, respectively.

9. An improved electronic system for effecting automatic control of high and low beam headlights of a vehicle having a source of electrical energy, comprising a vacuum tube, a light sensitive electron emitting device, circuit means connecting said light sensitive device with said tube to thereby bias said tube to materially reduce the electron flow through said tube in response to energization of said device, a differential relay including first and second coils having opposed magnetic fields and a single pole double throw switch, circuit means connecting said first coil of said relay with said tube and adapted to connect said tube and said first coil with said source so that electrons will flow from said source through said tube and said first coil and back to said source, a fixed resistor, circuit means connecting said fixed resistor in series with the second coil of said differential relay and adapted to connect said last mentioned circuit components with said source so that said second coil will remain energized, circuit means adapted to connect the movable contact of said single pole double throw switch to said source, a power relay including a coil and a single pole double throw switch, circuit means connecting the coil of said power relay with the switch of said differential relay and adapted to connect said last mentioned components with said source so that said power relay is energized when the switch of said differential switch is in its de-energized position, circuit means connecting said differential relay switch with said fixed resistor so that said fixed resistor is shorted out to thereby increase current flow through said second coil in response to energization of said differential relay switch, and circuit means adapted to connect the movable contact of said power relay switch with said source and the remaining contacts with said high and low beam headlights so that either said high beam headlights or low beam headlights will be energized in response to energization or de-energization of said power relay, respectively.

10. An improved electronic system for effecting automatic control of high and low beam headlights of a vehicle having a source of electrical energy, comprising a vacuum tube having a plate member; a grid member and an electron emitting member, said vacuum tube having a translucent envelope and being so constructed that the grid member is directly exposed to light passing through said envelope, a light sensitive electron emitting device, a bias cell, circuit means connecting said light sensitive device in series with said bias cell and between said emitting member of said tube and said grid member so that electrons emitted from said device in response to light applied thereto will be disposed on said grid member, a grid light, a first variable resistor, circuit means connecting said resistor in series with said grid light and adapted to connect same with said source so that the intensity of emitted light from said grid light will vary in response to change in value of said resistor, said grid light being disposed adjacent the envelope of said vacuum so that light emitted therefrom will strike said grid element to thereby cause electron emission from said grid element and bias said grid member relative to said electron emitting member of said tube, a differential relay including first and second coils having opposed magnetic fields and a single pole double throw switch, circuit means connecting said first coil of said relay with said plate element of said tube and adapted to connect said electron emitting member of said tube and said first coil with said source so that electrons will flow from said source through said tube and said first coil and back to said source, the electron flow through said tube and first coil being substantially unimpaired when said light sensitive device is unenergized but being substantially reduced in response to the flow of electrons from said device to said grid element, a second variable resistor, a fixed resistor, circuit means connecting said second variable resistor and said fixed resistor in series with the second coil of said differential relay and adapted to connect said last mentioned circuit components with said source so that said second coil will remain energized, said second variable resistor being operable to regulate the intensity of the magnetic field of said second coil, circuit means adapted to connect the movable contact of said single pole double throw switch to said source, a power relay including a coil and a single pole double throw switch, circuit means connecting the coil of said power relay with the switch of said differential relay and adapted to connect said last mentioned components with said source so that said power relay is energized when the switch of said differential switch is in its de-energized position, circuit means connecting said differential relay switch with said fixed resistor so that said fixed resistor is shorted out to thereby increase current flow through said second coil in response to energization of said differential relay switch, and circuit means adapted to connect the movable contact of said power relay switch with said source and the remaining contacts with said high and low beam headlights so that either said high beam headlights or low beam headlights will be energized in response to energization or de-energization of said power relay, respectively.

11. An improved electronic system comprising a source of electrical energy, a vacuum tube having a plate member; a grid member and an electron emitting member, said vacuum tube having a translucent envelope and being so constructed that the grid member is directly exposed to light passing through said envelope, circuit means connected between said emitting member of said tube and said grid member so that electrons will be disposed on said grid member, a grid light, a variable resistor, circuit means connecting said resistor in series with said grid light and with said source so that the intensity of emitted light from said grid light will vary in response to change in value of said resistor, said grid light being disposed adjacent the envelope of said vacuum so that light emitted therefrom will strike said grid element to thereby cause electron emission from said grid element and bias said grid element relative to said electron emitting member of said tube, and load means connected to said plate member and to said source.

12. In combination with a vehicle having high and low beam headlamps and a battery having a predetermined voltage rating; an electronic system for effecting automatic control of said high and low beam headlamps comprising a vacuum tube having a plate member, a grid member and an electron emitting member, a light sensitive device operatively connected with said grid member for controlling the conduction of said tube, circuit means interconnecting the plate member and the emitting member of said tube and said battery so that said tube operates substantially at said voltage rating of said battery, and additional circuit means interconnecting said last mentioned circuit means and said headlamps for effecting automatic control thereof in response to the conduction of said tube.

References Cited in the file of this patent
UNITED STATES PATENTS

| | | |
|---|---|---|
| 2,052,542 | Thomas | Aug. 25, 1936 |
| 2,307,697 | McIlvaine | Jan. 5, 1943 |
| 2,476,389 | Schmidt | July 19, 1949 |
| 2,598,420 | Onksen | May 27, 1952 |